US012601822B2

(12) United States Patent
Taylor et al.

(10) Patent No.: US 12,601,822 B2
(45) Date of Patent: Apr. 14, 2026

(54) SYSTEM AND METHOD FOR SONAR IMAGE DISPLAY

(71) Applicant: Furuno Electric Co., Ltd.,
Nishinomiya (JP)

(72) Inventors: Matthew Clive Taylor, Auckland (NZ);
Gavin John Sentch, Auckland (NZ)

(73) Assignee: FURUNO ELECTRIC CO., LTD.,
Nishinomiya (JP)

( * ) Notice: Subject to any disclaimer, the term of this
patent is extended or adjusted under 35
U.S.C. 154(b) by 136 days.

(21) Appl. No.: 18/398,493

(22) Filed: Dec. 28, 2023

(65) Prior Publication Data

US 2025/0216528 A1    Jul. 3, 2025

(51) Int. Cl.
G01S 7/62        (2006.01)

(52) U.S. Cl.
CPC .......... G01S 7/6218 (2013.01); G01S 7/6263
(2013.01)

(58) Field of Classification Search
CPC .............................. G01S 7/6218; G01S 7/6263
USPC ......................................................... 367/103
See application file for complete search history.

(56) References Cited

U.S. PATENT DOCUMENTS

| | | | |
|---|---|---|---|
| 7,355,924 B2 | 4/2008 | Zimmerman et al. | |
| 8,456,956 B2 | 6/2013 | Wang et al. | |
| 10,481,259 B2 * | 11/2019 | Langford-Wood | ... G01S 7/6272 |
| 11,639,996 B2 | 5/2023 | Clark et al. | |
| 11,947,007 B2 * | 4/2024 | Hooper | ................. G06T 11/001 |
| 2003/0202426 A1 * | 10/2003 | Ishihara | .................. G01S 15/96 |
| | | | 367/103 |
| 2013/0286022 A1 * | 10/2013 | Kubota | ...................... G01S 7/10 |
| | | | 345/440 |
| 2017/0371039 A1 | 12/2017 | Clark et al. | |
| 2020/0363922 A1 * | 11/2020 | Nagai | ...................... G01S 15/42 |
| 2021/0278850 A1 * | 9/2021 | Moore | .................. G01S 17/931 |
| 2022/0171043 A1 * | 6/2022 | Neumann | .............. G01S 7/539 |

\* cited by examiner

*Primary Examiner* — Yuqing Xiao
*Assistant Examiner* — Christopher Richard Walker
(74) *Attorney, Agent, or Firm* — XSENSUS LLP

(57)        ABSTRACT

A sonar system including a transducer and processing cir-
cuitry is disclosed. The transducer receives an ultrasonic
reflection wave corresponding to a reflection of an ultrasonic
transmission wave on an underwater object and generates a
return signal based on the ultrasonic reflection wave. The
processing circuitry generates reception beams making dif-
ferent angles with the horizontal direction by performing a
beamforming process based on the return signal. The pro-
cessing circuitry generates reception beam data for each
reception beam, detects targets within the reception beam
data, and creates a list of the detected targets. Each target is
defined by a range associated with the transducer and an
angle of corresponding reception beam on which the target
is detected. The processing circuitry generates the sonar
image by placing a predetermined graphical image for each
target in the list at a position calculated based on the range
and the angle of the target.

20 Claims, 9 Drawing Sheets

300

400

500
502
504
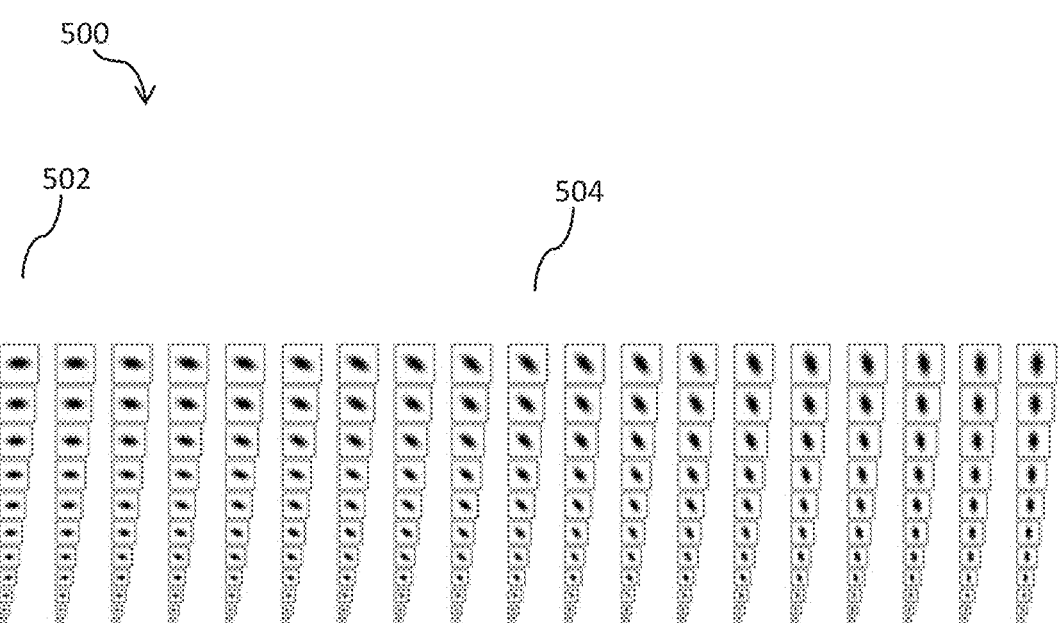
FIG. 5A
504
502
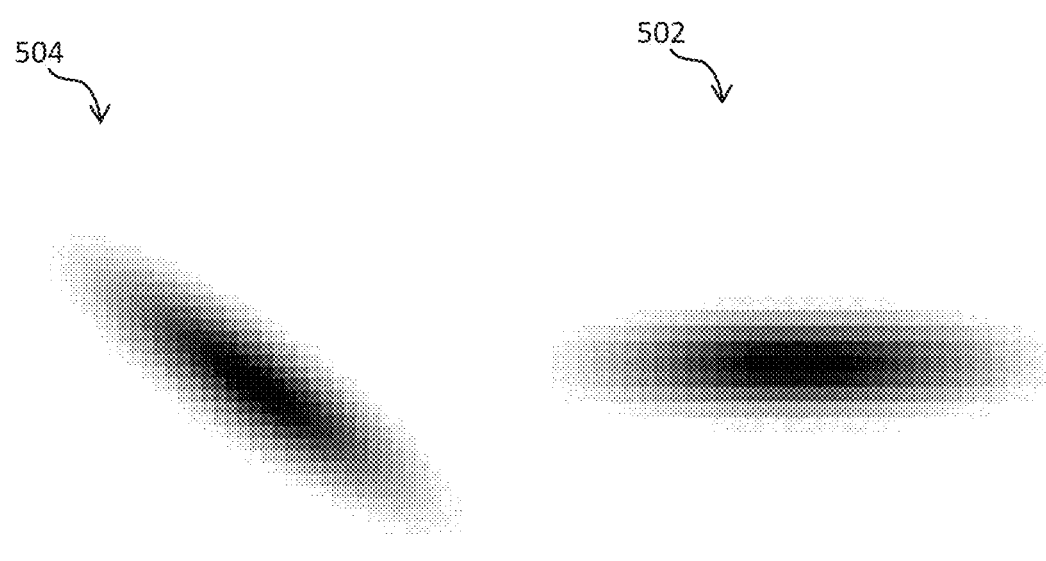
FIG. 5B          FIG. 5C

600

1002    1004    1006

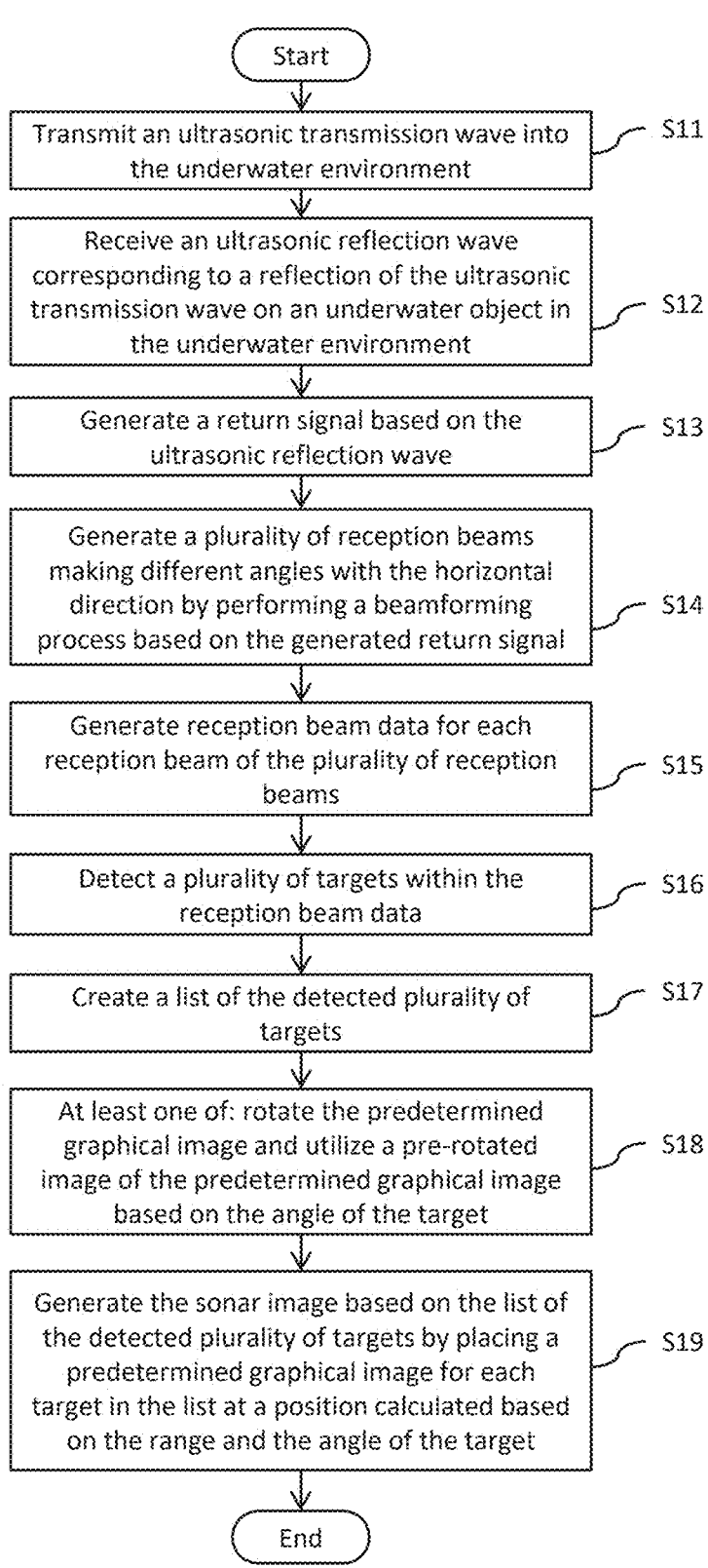

Start

Transmit an ultrasonic transmission wave into the underwater environment — S11

Receive an ultrasonic reflection wave corresponding to a reflection of the ultrasonic transmission wave on an underwater object in the underwater environment — S12

Generate a return signal based on the ultrasonic reflection wave — S13

Generate a plurality of reception beams making different angles with the horizontal direction by performing a beamforming process based on the generated return signal — S14

Generate reception beam data for each reception beam of the plurality of reception beams — S15

Detect a plurality of targets within the reception beam data — S16

Create a list of the detected plurality of targets — S17

At least one of: rotate the predetermined graphical image and utilize a pre-rotated image of the predetermined graphical image based on the angle of the target — S18

Generate the sonar image based on the list of the detected plurality of targets by placing a predetermined graphical image for each target in the list at a position calculated based on the range and the angle of the target — S19

End

FIG. 11

SYSTEM AND METHOD FOR SONAR IMAGE DISPLAY

TECHNICAL FIELD

The present disclosure relates to sonar systems and method, and more specifically to system and method for sonar image display.

BACKGROUND

Sonar systems are widely utilized for various applications, including underwater exploration, navigation, and target detection. These systems often generate vast amounts of data, which must be processed and displayed efficiently to extract meaningful information. Traditionally, the sonar systems have employed methods to represent signal intensity, commonly utilizing different colors or varying intensity levels to depict different signal strengths. The challenge arises when dealing with complex sonar data that encompasses multiple dimensions of signals, which may include various types of echoes and reflections from underwater objects and surfaces. To present this data effectively, the sonar systems may employ angular or rectangular displays. In many cases, signal intensity is aggregated or peak-detected over a finite cross-sectional width, allowing for a comprehensive representation of the underwater environment on a two-dimensional (2D) display. Alternatively, more advanced sonar systems utilize three-dimensional (3D) visualization methods to provide a more immersive view.

Modern sonar systems have made significant advancements, enabling automatic or user-assisted differentiation between seafloor echoes and water column echoes. For instance, products like the WASSP G1/G2/G3 series generate a point cloud of water column targets and overlay them onto a 3D surface generated by sonar bathymetry. The appearance of these targets may take the form of circles or polygons that fill the area, with size and color changing based on signal intensity. The data may be digitized by beam, employing intelligent processing to identify multiple targets instead of treating them as single point targets. In some cases, the detection may be down sampled by range due to processing limitations.

2D analog sonar displays, which are typically generated from a beamforming process applied to a 1D or 2D array, have angular resolution influenced by the aperture size relative to the sonar frequency. While increasing the processed beams may result in a smoother display, the native size of the targets remains unaltered. Advanced beamforming techniques offer the potential to reduce the effective beam size, surpassing the limits of linear array dimensions. However, these methods necessitate intensive processing, which may not be desirable when dealing with a large number of receiver elements. Moreover, these techniques may introduce distortions in signal intensity or affect the overall data quality.

During utilization of traditional filtering methods, such as historical filters, challenges arise when targets move between transmission cycles or when the sonar system undergoes movement not fully compensated due to measurement inaccuracies or processing constraints. These situations may lead to signal distortion or, in the worst-case scenario, may be unable to detect targets. Additionally, filtering may introduce distortions when dealing with noise or sidelobes in the data.

In light of the foregoing, there is a need for providing a technical solution that overcomes the challenges and shortcomings of conventional sonar systems.

SUMMARY

In an embodiment of the present disclosure, there is provided a sonar system for facilitating a sonar image representing an underwater environment. The sonar system includes a transducer and processing circuitry. The transducer includes a plurality of transducer elements. The transducer is configured to transmit an ultrasonic transmission wave into the underwater environment and receive an ultrasonic reflection wave corresponding to a reflection of the ultrasonic transmission wave on an underwater object in the underwater environment. Each transducer element of the plurality of transducer elements is configured to generate a return signal based on the ultrasonic reflection wave. The processing circuitry is configured to generate a plurality of reception beams making different angles with the horizontal direction by performing a beamforming process based on the return signal generated by each transducer element of the plurality of transducer elements. The processing circuitry is further configured to generate reception beam data for each reception beam of the plurality of reception beams, detect a plurality of targets within the reception beam data, and create a list of the detected plurality of targets. Each target of the plurality of targets is defined at least by a range associated with the transducer and an angle of corresponding reception beam on which the target is detected. The processing circuitry is further configured to generate the sonar image based on the list of the detected plurality of targets by placing a predetermined graphical image for each target of the plurality of targets in the list at a position calculated based on the range and the angle of the target.

Additionally, or optionally, the predetermined graphical image may comprise at least a core portion and a ring portion surrounding the core portion. The core portion may have a core color and the ring portion may have a ring color different from the core color. Each target in the list may further be defined by an intensity of the reception beam data of the detected target. The intensity of the target may determine the core color of the predetermined graphical image of the target. The intensity of the target may determine the ring color based on the core color and a color table.

In another embodiment of the present disclosure, there is provided a sonar method for facilitating a sonar image representing an underwater environment. The sonar method includes transmitting an ultrasonic transmission wave into the underwater environment with a transducer, receiving an ultrasonic reflection wave corresponding to a reflection of the ultrasonic transmission wave on an underwater object in the underwater environment, generating a return signal based on the ultrasonic reflection wave, generating a plurality of reception beams making different angles with the horizontal direction by performing a beamforming process based on the generated return signal, generating reception beam data for each reception beam of the plurality of reception beams, detecting a plurality of targets within the reception beam data, creating a list of the detected plurality of targets, each target of the plurality of targets defined at least by a range associated with the transducer and an angle of corresponding reception beam on which the target is detected, and generating the sonar image based on the list of the detected plurality of targets by placing a predetermined graphical image for each target of the plurality of targets in the list at a position calculated based on the range and the angle of the target.

In yet another embodiment of the present disclosure, there is provided a non-transitory computer-readable storage medium having stored thereon machine-readable instructions that, when executed by one or more processors of an apparatus, cause the apparatus to perform a method including transmitting an ultrasonic transmission wave into the underwater environment with a transducer, receiving an ultrasonic reflection wave corresponding to a reflection of the ultrasonic transmission wave on an underwater object in the underwater environment, generating a return signal based on the ultrasonic reflection wave, generating a plurality of reception beams making different angles with the horizontal direction by performing a beamforming process based on the generated return signal, generating reception beam data for each reception beam of the plurality of reception beams, detecting a plurality of targets within the reception beam data, creating a list of the detected plurality of targets, each target of the plurality of targets defined at least by a range associated with the transducer and an angle of corresponding reception beam on which the target is detected, and generating the sonar image based on the list of the detected plurality of targets by placing a predetermined graphical image for each target of the plurality of targets in the list at a position calculated based on the range and the angle of the target.

The sonar system efficiently analyzes sonar data to create a detailed and comprehensive list of targets of interest. Along with magnitudes, these targets are further characterized by precise positions in terms of range, angle, displacement, and other relevant parameters, providing a rich and informative dataset. The sonar system has the ability to apply filtering and metrics to the identified targets to ensure that the extracted targets meet stringent quality criteria, enabling the system to distinguish and prioritize the most relevant and significant data points. The culmination of this process is the generation of a clean and representative sonar display. By utilizing the processed targets, the sonar system constructs a visually coherent and informative representation of the underwater environment. This sonar image displayed enhances the clarity and precision of the data and significantly reduces unwanted noise, distortions, and irrelevant information.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 5A illustrates a table including rotated sprites, in accordance with an example embodiment;

FIGS. 5B and 5C illustrate predetermined graphical images with different angular rotations, in accordance with an example embodiment;

FIG. 11 is a flow chart illustrating a sonar method for facilitating a sonar image representing an underwater environment, in accordance with an example embodiment.

DETAILED DESCRIPTION OF THE EMBODIMENTS

Figures 1A, 1B:
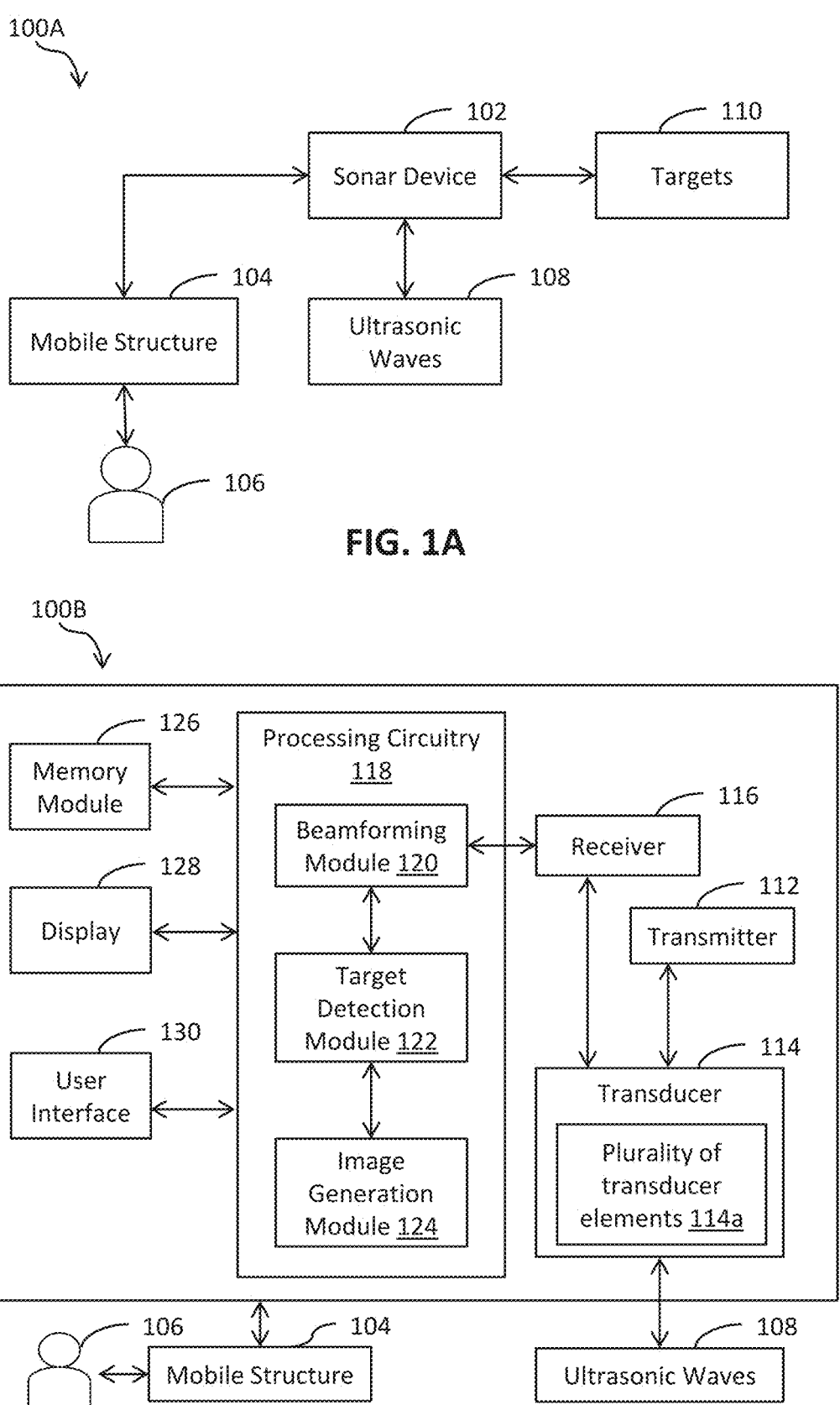
FIG. 1A is a schematic diagram that exemplarily illustrates a working environment of a sonar device, in accordance with an example embodiment.
FIG. 1B is a block diagram of the sonar device, exemplarily illustrated in FIG. 1A, in accordance with an example embodiment.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

FIG. 1A is a schematic diagram that exemplarily illustrates a working environment 100A of a sonar device 102, in accordance with an example embodiment. The working environment 100A or a sonar system 100A includes the sonar device 102, a mobile structure 104 (which may also be referred to as a vessel), an operator 106, ultrasonic waves 108, and a target 110. In an example embodiment, the sonar device 102 is installed in the mobile structure 104. The mobile structure 104 may be a vessel navigating over a water body. The water body may comprise a sea, an ocean, a river, or the like. In an example embodiment, the sonar device 102 is deployed to detect and identify the target 110, such as fish, fish schools, submarines, and mines. In another embodiment, the sonar device 102 is deployed to detect a potential shoal hazard ahead of the mobile structure 104. In an embodiment, the sonar device 102 may be used during offshore monitoring without the presence of the mobile structure 104. In an example, the mobile structure 104 may correspond to a ship, a boat, or the like. In general, the sonar device 102 is configured to detect and determine distance and direction of underwater objects with respect to the sonar device 102 by use of acoustic means. For example, sound waves emitted by the sonar device 102 and reflected sound waves from the object are detected and analyzed by the sonar device 102. In an exemplary embodiment, the sound waves may be the ultrasonic waves 108.

The sonar device 102 is configured to transmit the ultrasonic waves 108 in the water body. The sonar device 102 receives reflected ultrasonic waves 108 from one or more objects (e.g., the target 110) in the water body and generates a reception signal based on the reflected ultrasonic waves 108. In general, the ultrasonic waves 108 correspond to inaudible sound waves with a high frequency (generally exceeding 20 kHz). In an embodiment, the sonar device 102 transmits the ultrasonic waves 108 and further generates the reception signal by detecting the ultrasonic waves 108 after they reflect from the one or more objects in the water body. In addition, a plurality of reception beams is generated based on the reception signal for target detection. A detailed analysis of the sonar device 102 is described below with respect to FIG. 1B.

FIG. 1B is a block diagram 100B of the sonar device 102, exemplarily illustrated in FIG. 1A, in accordance with an example embodiment. The sonar device 102 includes a transmitter 112, a transducer 114, and a receiver 116. In addition, the sonar device 102 includes processing circuitry 118 including a beamforming module 120, a target detection module 122, and an image generation module 124. Further, the sonar device 102 includes a memory module 126 (also referred to hereinafter as memory), a display 128, and a user interface 130.

The transmitter 112 may be configured to transmit a transmission signal to the transducer 114. For example, the transmission signal is an electrical signal. The transducer 114 receives the transmission signal. The transducer 114 may include a plurality of transducer elements 114a. The transmitter 112 transmits the transmission signal to each transducer element of the plurality of transducer elements 114a. The plurality of transducer elements 114a corresponds to ultrasonic transducer elements such as an array of piezo-electric crystals. The transducer 114 transforms the transmission signal into the ultrasonic waves 108. The transducer 114 is configured to transmit the ultrasonic waves 108 (ultrasonic transmission waves) in a wide transmission beam in the water body, such as a sea. The ultrasonic waves 108 may be transmitted towards a seafloor of the water body or the sea. The ultrasonic waves 108 travel through the water body and get reflected back after striking the one or more objects, such as the seafloor or targets 110 that may be in the water body. Each of the plurality of transducer elements 114a of the transducer 114 is configured to receive the ultrasonic waves 108 (ultrasonic reflection waves) reflected from the one or more objects in the water body corresponding to a reflection of the ultrasonic transmission wave on an underwater object in the underwater environment. Further, each transducer element 114a of the transducer 114 is configured to generate a return signal based on the reflected ultrasonic waves 108 and the transducer 114 provides the return signals to the receiver 116. The receiver 116 receives and provides the return signals to the processing circuitry 118.

The beamforming module 120 is configured to receive the reception signals from the receiver 116. In addition, the beamforming module 120 is configured to generate a plurality of reception beams based on the return signals generated by each transducer element of the plurality of transducer elements 114a. The beamforming module 120 performs beamforming on the received return signals to generate the plurality of reception beams. Further, the beamforming module 120 is configured to generate the plurality of reception beams making different angles with the horizontal direction by performing the beamforming process. The reception beams are utilized to detect the one or more objects, such as the seafloor in the water body and the targets 110 in multiple directions. Further, a width of each reception beam of the plurality of reception beams is thin or narrow as compared to a width of the transmission beam. The width of the plurality of reception beams depends on a number of the plurality of transducer elements 114a within the transducer 114. In an example, an angle between two reception beams is set to 1 degree. In another example, the angle between two reception beams may be set to any value, for example, 2 degrees. The beamforming module 120 is configured to generate reception beam data for each reception beam of the plurality of reception beams. Further, the reception beam data is utilized to detect a plurality of targets 110 with facilitation of the target detection module 122. The target detection module 122 is configured to detect the plurality of targets 110 based on the reception beam data and create a list of the detected plurality of targets. Each target of the plurality of targets is defined at least by a range associated with the transducer 114 and an angle of corresponding reception beam on which the target is detected. In one embodiment, the range corresponds to a distance between the target and the transducer 114.

Based on the detection of the targets, the image generation module 124 is configured to generate the sonar image based on the list of the detected plurality of targets by placing a predetermined graphical image for each target of the plurality of targets in the list at a position calculated based on the range and the angle of the target. In an embodiment, each target in the list is further defined by an intensity of the reception beam data of the detected target. The image generation module 124 may be further configured to filter the intensity of the reception beam data corresponding to each target in the list and render the filtered intensity of the reception beam data by placing the predetermined graphical image of each target in the list in the sonar image.

The sonar device 102 receives the reflected ultrasonic waves 108 (or the echoes) from the seafloor and the one or more objects such as fish, underwater structures, and the like. In order to distinguish the echoes of the seafloor from the echoes of the one or more objects, the sonar device 102 performs echo discrimination using one or more algorithms that distinguish the echoes of the seafloor based on echo signal level and continuity of the echoes along long distances.

Figure 2A:
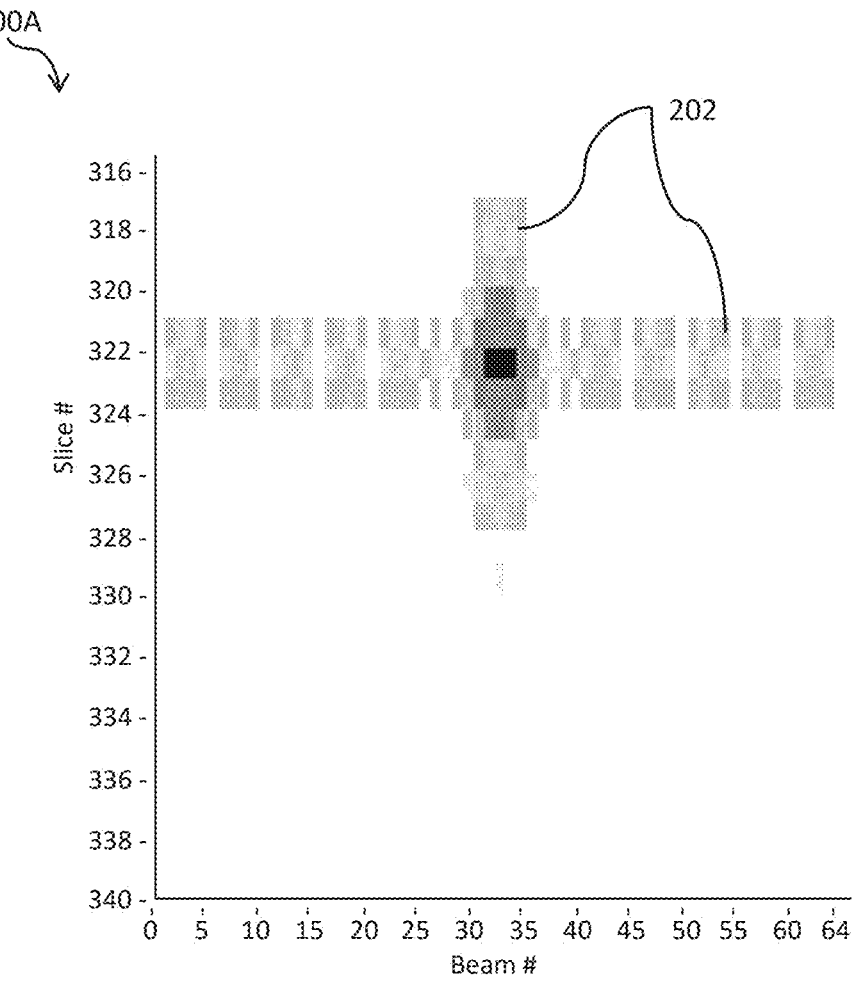
FIG. 2A is a diagram that illustrates a point target and associated sidelobes, in accordance with an example embodiment.
Figure 2B:
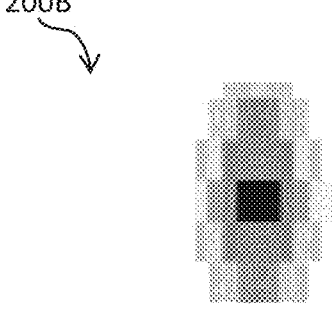
FIG. 2B is a diagram that illustrates a point target, in accordance with an example embodiment.

FIG. 2A is a diagram that illustrates a point target 200A and associated sidelobes 202, in accordance with an example embodiment. FIG. 2B is a diagram that illustrates a point target 200B, in accordance with an example embodiment. The sonar system 100A (1D swath or 2D swath) is a system where each sample's angle is scanned for valid signal detections, such as, a single point target as shown in FIG. 2A. A point target, such as the point target 200A, is a target that is comparatively very small relative to the size of the sonar resolution. As shown in FIG. 2A, the point target 200A is associated with the sidelobes 202 in both the directions vertically, i.e., along the range, and laterally, i.e., along azimuth (i.e., the angle of reception beam). The target is located at the centre of the point target 200A. The surrounding signals, the sidelobes 202, are the natural filtering of the return signal through the signal processing pathway. If the sidelobes 202 are filtered out, a clean target, e.g., the point target 200B, would ideally be rendered as shown in FIG. 2B, without the sidelobes 202.

In an embodiment, the point target 200B may consist of an area of 10 beams (horizontal axis in FIG. 2B) by 5 samples (vertical axis in FIG. 2B) (i.e., 50 data points) even though the target is a single data point. In an example, if a centre location and magnitude of an echo signal is obtained, the point target 200B may be generated by placing an appropriate beam shape at the same point. The beamforming module 120 may generate the reception beam data for each reception beam of the plurality of reception beams, such that the reception beam data includes information associated with the beam such as an intensity, a size, a shape, and an angle of the reception beam.

The target detection module 122 detects such targets which may be point targets, such as the point target 200A or 200B, and targets that are wider than a single point. The targets that are wider than a single point create multiple targets so that the resultant sonar image renders the increased width. The target detection module 122 creates the list of the detected plurality of targets such that each target of the plurality of targets is defined at least by a range associated with the transducer 114 and an angle of corresponding reception beam on which the target is detected.

Figure 3:
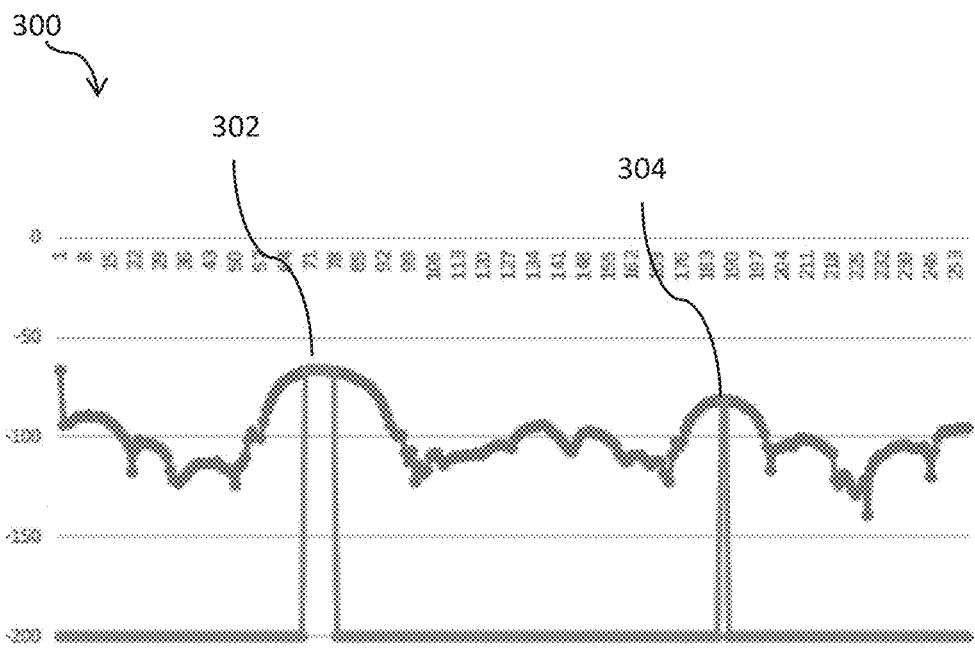
FIG. 3 is a line graph that illustrates an intensity of reception beam data of one of the reception beams, in accordance with an example embodiment.

FIG. 3 is a line graph 300 that illustrates an intensity of reception beam data of one of the reception beams, in accordance with an example embodiment, where, a horizontal axis represents samples of reception beam data, i.e., range, and a vertical axis represents intensity. The target detection module 122 may be configured to detect the targets by scanning the sonar data (the reception beam data) for all the reception beams to detect point targets and bigger targets. Target detection may be performed for example by peak detection of peaks above a given intensity threshold in the reception beam data. There is however no such limitation as there are many other conventional methods known for target detection. In an embodiment, the bigger targets may be also detected and represented as multiple point targets that are overlapping to encode the entire sonar image into point data. Such a condensed data format for the sonar image may be advantages for processing. When a target is wider than a single point target it is registered as at least two targets to allow regeneration of the representative sonar picture. In FIG. 3, a target 302 is wider than target 304. Thus, to represent the target 302 two or more beam targets will be identified by the target detection module 122. In an embodiment, overlapping samples may not be required, so detection density is limited to partial overlap spacing, such as 0.1 to 1×physical beam width.

The target detection module 122 may restrict the target detection to a maximum of one per singular beam width and the location of the peak of the beam is estimated as accurately as possible using correlation techniques. The detection process utilized by the target detection module 122 may have the ability to scan for distortions of the beam or methods to assist with false target reduction and avoiding missing real targets of interest. The target detection module 122 generates a list of points, associated with the detected targets, with magnitude and location information. Each target in the list is further defined by an intensity (i.e., a magnitude) of the reception beam data of the detected target. Further, the target detection module 122 may be configured to associate each target in the list with a detection quality index that defines a degree of certainty of the target detection. For example, where detection is ambiguous the detection quality index is utilized to assist with upstream filtering.

Figure 4:
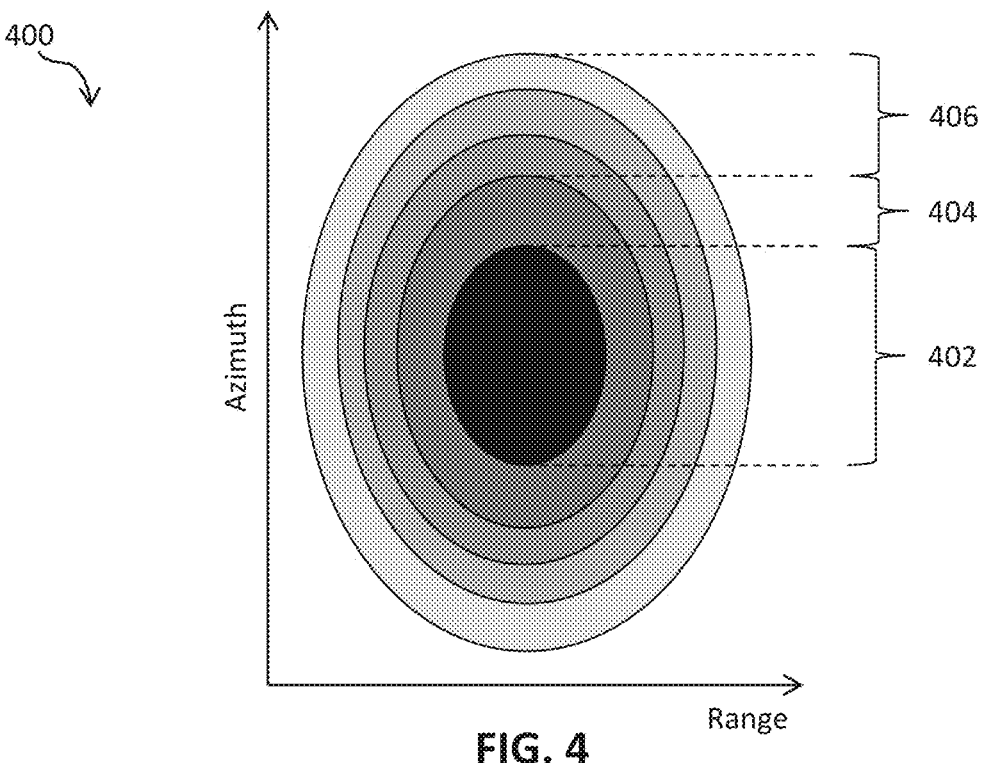
FIG. 4 illustrates a predetermined graphical image corresponding to a detected target, in accordance with an example embodiment.

FIG. 4 illustrates a predetermined graphical image 400 corresponding to a detected target, in accordance with an example embodiment. As shown in FIG. 4, the predetermined graphical image 400 is represented in two dimensional coordinate system, where a vertical axis represents azimuth, and a horizontal axis represents range. A shape of the predetermined graphical image 400 is a stretched-out circle. In one embodiment, the stretched-out circle is formed by stretching a circle along the vertical axis, i.e., along the azimuth. It will be understood by a person skilled in the art that the circle may be stretched in either dimension as determined by an aspect ratio and a sampling resolution with respect to the beamwidth and range, without deviating from the scope of the present disclosure. The predetermined graphical image 400 includes at least a core portion 402 and a ring portion 404 surrounding the core portion 402. In an embodiment, the core portion 402 has a core color and the ring portion 404 has a ring color different from the core color. In an embodiment, the predetermined graphical image 400 further includes a set of outer ring portions 406 surrounding the ring portion 404. A color of the set of outer ring portions 406 is different from the core color and the ring color. The set of outer ring portions 406 includes one or multiple outer rings. In one embodiment, a color of each outer ring of the set of outer ring portions 406 is different. In another embodiment, the color of each outer ring of the set of outer ring portions 406 is same or a different shade of the same color. In an example, the set of outer ring portions 406 include three outer rings. It will be understood by a person skilled in the art that the set of outer ring portions 406 may include any number of outer rings suitable, without deviating from the scope of the present disclosure.

In an embodiment, the intensity of the target determines the core color of the predetermined graphical image 400 of the target. For example, if the intensity of the target is high the core color of the predetermined graphical image 400 of the target is red which may be easily identifiable by the user to indicate a definite target, and if the intensity of the target is low the core color of the predetermined graphical image 400 of the target is yellow or green to indicate a probable target.

Further, in an embodiment, the intensity of the target determines the ring color based on the core color and a color table. In one example, the color table may include a list of colors to be utilized for the core color and the ring color based on the intensity of the target. For example, without any limitation to the number of colors and the colors themselves, the color table may have eight colors, red (strong intensity), orange, yellow, green, blue, purple, dark blue and black (low intensity) to code intensity from strong intensity to low intensity. For example, if the intensity of the target is high the core color of the predetermined graphical image 400 of the target may be set to red. As a result, the ring color is for example set to the next color in the color table (i.e., orange), and outer ring portions of the set of outer ring portions are set to the next colors in the color table, i.e., between yellow and black. If the intensity of the target is low the core color of the predetermined graphical image 400 of the target is for example set to green and consequently the ring color is for example set to blue and outer ring portions of the set of outer ring portions are set to colors between purple and black.

Further, in an embodiment, a size of the predetermined graphical image 400 of each target of the plurality of targets is determined based on the range of the target. For example, if the range of the target is near or low, the size of the predetermined graphical image 400 is small and if the range of the target is far or high, the size of the predetermined graphical image 400 is large, comparatively. In other words, a size of the predetermined graphical image of a first target having a farther range than a second target is larger than a size of the predetermined graphical image of the second target. Additionally, in an embodiment, at least one of: a color and a transparency of the predetermined graphical image 400 of each target is adjusted according to the detection quality index of the corresponding target. For example, if the detection quality index of the target is low, the transparency of the predetermined graphical image 400 is high or the color is light, and if the detection quality index of the target is high, the transparency of the predetermined graphical image 400 is low or the color is dark, comparatively.

The image generation module 124 generates the sonar image based on the list of the detected plurality of targets by placing the predetermined graphical image 400 for each target of the plurality of targets in the list at a position calculated based on the range and the angle of the target. The image generation module 124 renders the sonar image on the display 128 by emulating the predetermined graphical image 400 (i.e., a sonar display beam footprint) at the location determined by the target detection module 122. In an embodiment, the image generation module 124 is further configured to at least one of: rotate the predetermined graphical image 400 and utilize a pre-rotated image of the predetermined graphical image 400 based on the angle of the target. For example, the predetermined graphical image 400 when placed on the position of the target in the sonar image, the predetermined graphical image 400 is rotated based on the angle of the target, such as if the angle of the target is 45 degrees, the predetermined graphical image 400 is rotated 45 degrees and then placed on the sonar image.

FIG. 5A illustrates a table 500 including rotated sprites, in accordance with an example embodiment. In an embodiment, the predetermined graphical image 502/504 is a sprite. In this embodiment, the memory module 126 stores the table 500 including all the possible angular variations of the sprite based on all the possible angles of the target. The image generation module 124 may be configured to retrieve the table 500 from the memory module 126, select corresponding pre-rotated image of the predetermined graphical image 502/504 (i.e., pre-rotated sprite) based on the angle of the target and utilize the pre-rotated image of the predetermined graphical image 502/504 in the sonar image. FIGS. 5B and 5C illustrate predetermined graphical images 502/504 with different angular rotations, in accordance with an example embodiment. The table 500 may also include sprites of different sizes.

Figure 6:
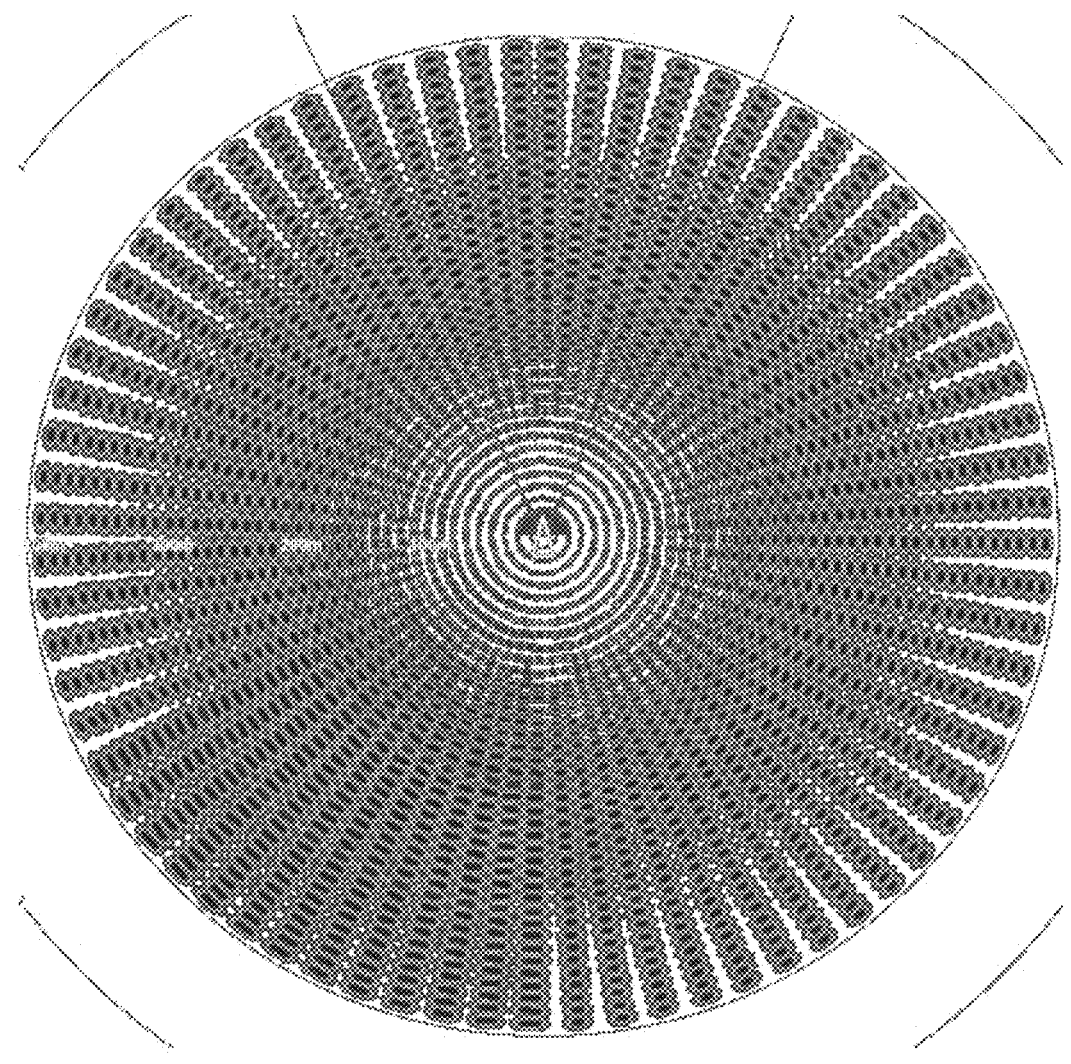
FIG. 6 illustrates multiple predetermined graphical images represented on a 360 degree sonar image, in accordance with an example embodiment.

FIG. 6 illustrates multiple predetermined graphical images represented on a 360 degree sonar image 600, in accordance with an example embodiment. The multiple predetermined graphical images or sprites are represented on the 360 degree sonar image 600 with equal angular detections, for example, detections at every 5 degrees, with repeated detections, for example, detection at every 10 meters. In one embodiment, the beam width of the sprites may be fixed with range such that a size of the sprite varies linearly with the range of the detected target. In one example, the beam width may be the system physical beam width, an increased beam width, or a reduced beam width to make the interpretation of the displayed sonar image easy. A range axis width of the sprite may be adjusted as per requirement for enhancing a quality of the displayed sonar image, for example, larger to improve visibility or smaller to improve resolution.

Further, the image generation module 124 is configured to adjust the transparency of the predetermined graphical image corresponding to a target in real time. For example, the predetermined graphical image corresponding to a target with low detection quality may be displayed with high transparency until the quality is improved. Once the quality of detection, i.e., the detection quality index, of the target is high the associated predetermined graphical image may be displayed with low transparency.

Figure 7:
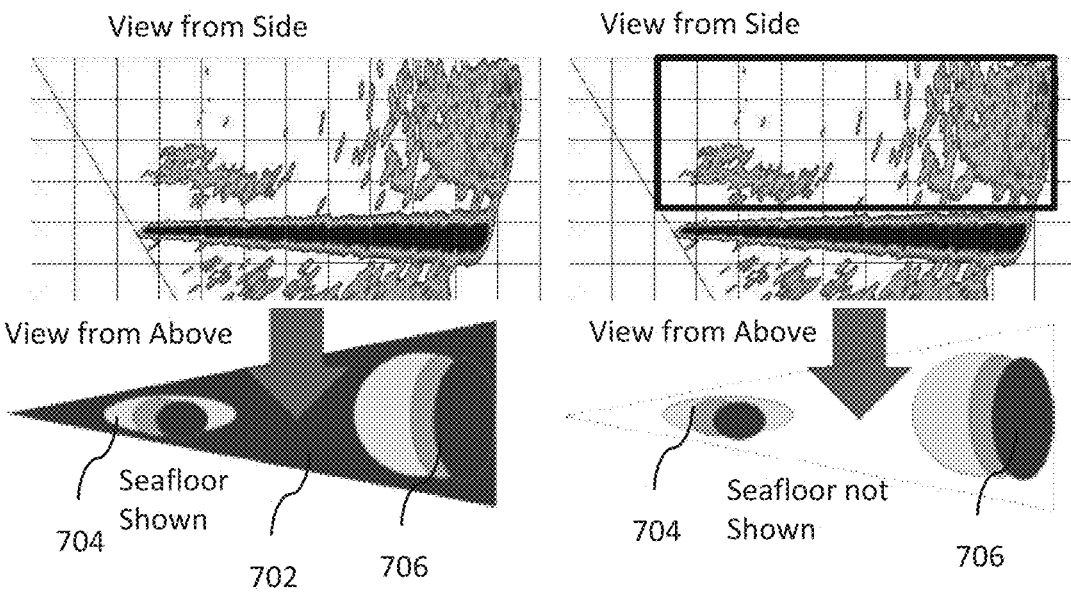
FIG. 7 is a diagram illustrating discriminatory display of targets based on target classification, in accordance with an example embodiment.

FIG. 7 is a diagram illustrating discriminatory display of targets based on target classification, in accordance with an example embodiment. To generate the sonar image, the image generation module 124 may be further configured to filter the intensity of the reception beam data corresponding to each target in the list and render the filtered intensity of the reception beam data by placing the predetermined graphical image of each target in the list in the sonar image, thus, generating a sonar image with filtered targets.

In an embodiment, the target detection module 122 may be configured to classify targets by type and the list of targets detected may include a type of target. The type of target may be utilized by the image generation module 124 to display specific information while discarding other information based on importance of the type of target. The target detection module 122 may classify the detected targets into the following types: a number of small point targets, a number of large point targets, a number of volumetric targets (such as fish schools), a seafloor/surface, a wall surface, a wave/surface returns, ships, aeration, noise signals, and multipath signals.

In one scenario, if all of the aforementioned types of detected targets are displayed in an overlapping manner on a selected viewing angle then the sonar image may be difficult to interpret. The image generation module 124 may thus select the types of detected targets to be displayed on the sonar image based on the importance of the type of detected target. For example, in a scenario, the seafloor 702 may be made transparent or not displayed such that water column targets 704 and 706 may be displayed for improved visibility and analysis such that the water column targets 704 and 706 are located and tracked easily.

Similarly, targets that constitute a hazard to navigation of the vessel or are considered part of the environment and thus not of interest such as large wall structures or fixed mooring poles may be rendered using the same sprite technique but with an alternative color table (e.g. grey scale to diminish or brighter colors to enhance) or alternative transparency (more transparent to diminish or less transparent to enhance) or alternative sprite shape (smaller to diminish, larger to enhance) to differentiate these from the other targets to make the display of the sonar image suitable to the application for which the sonar image is being used. Examples of techniques to execute the target discrimination mentioned above may include, but not be limited to: Contiguous Target size (area/volume); Backscatter return level; Measure of reception strength variance with range through target tracking and monitoring; Seafloor detection process, e.g., all targets that intersect with the seafloor are considered the seafloor and all targets below may be considered multipath returns or noise; Returns from the sea surface may be considered multipath or surface returns; Aeration may be classified by strength, coherency and location (close to surface); and Ships may be identified through location and target tracking and velocity computation.

Figure 8:
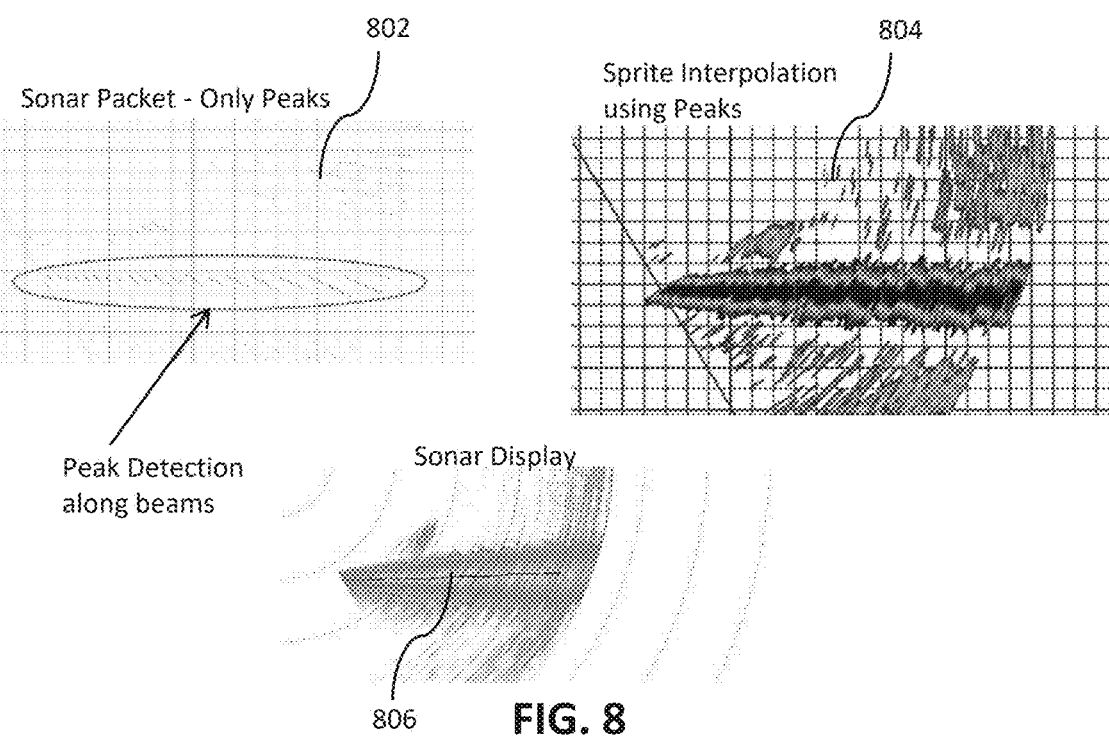
FIG. 8 illustrates conversion of sonar data to the sonar image, in accordance with an example embodiment.

FIG. 8 illustrates conversion of sonar data to the sonar image, in accordance with an example embodiment. The sonar data includes the reception beam data including indications of the detected peaks for different targets. A sonar peak image 802 includes the detected peaks that indicate the locations on which the predetermined graphical images or sprites are to be positioned. The image generation module 124 generates the sonar image 804 by placing the predetermined graphical images corresponding to the detected targets by adjusting the size, color, transparency, and angle of the predetermined graphical images based on the range, angle, intensity of the respective targets. FIG. 8 further illustrates a raw sonar image 806 in which it is difficult to identify different targets compared to the sonar image 804 which displays the targets represented by the sprites.

Figures 9A, 9B:
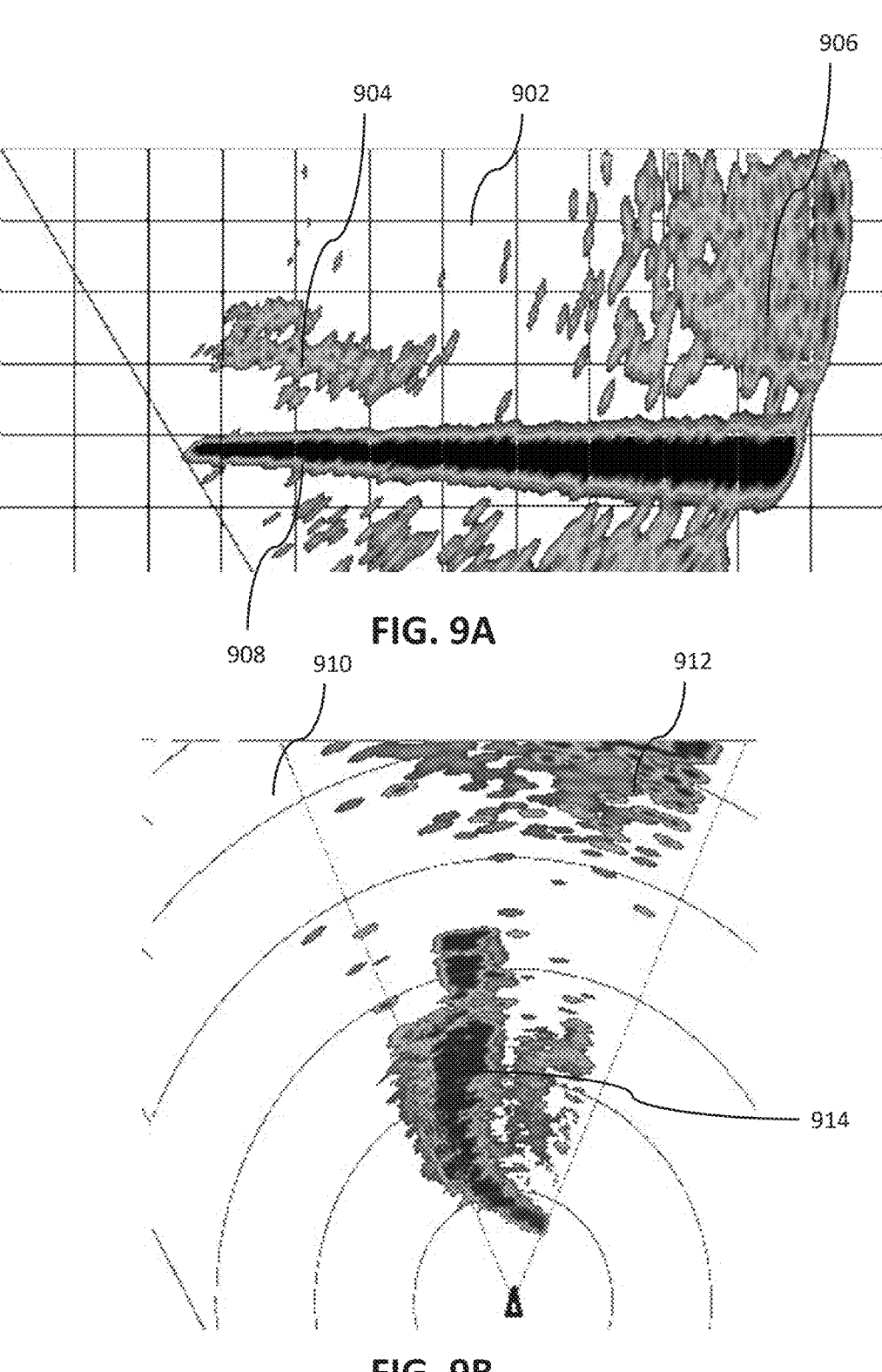
FIGS. 9A and 9B illustrate sonar images corresponding to different views, in accordance with an example embodiment.
Figure 10:
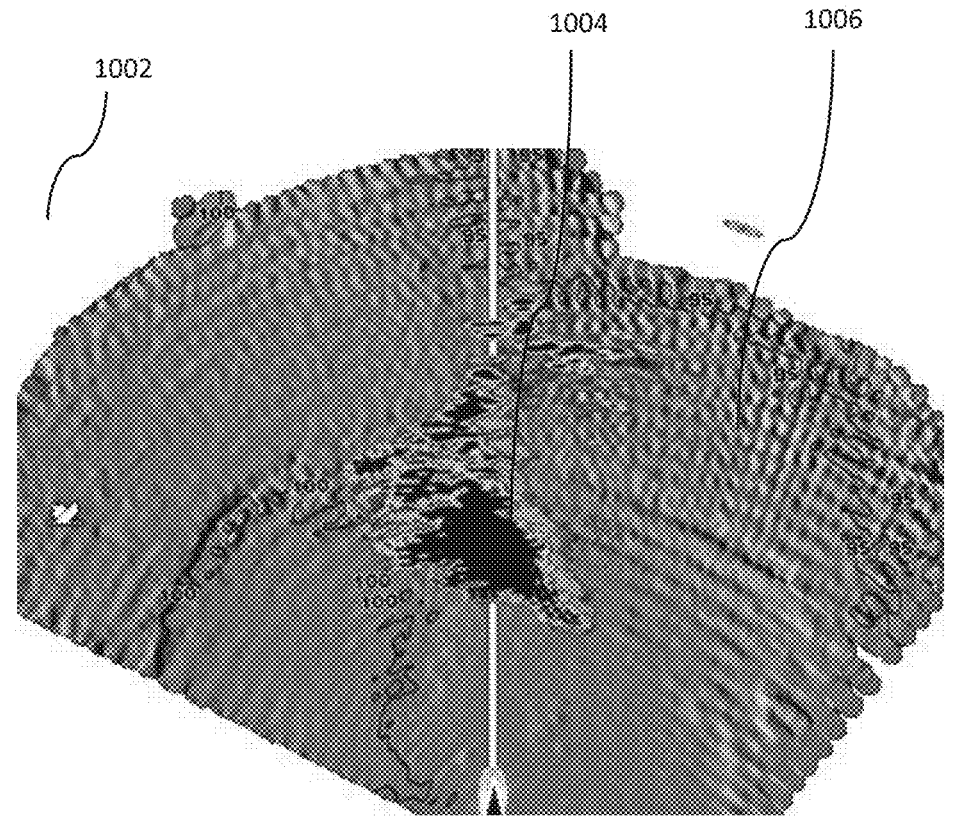
FIG. 10 illustrates a sonar image on 2D chart display, in accordance with an example embodiment.

FIGS. 9A and 9B illustrate sonar images corresponding to different views, in accordance with an example embodiment. FIG. 9A illustrates a sonar image 902 displaying a side view including targets 904 and 906 and the sea floor 908. FIG. 9B illustrates a sonar image 910 displaying a top view including targets 912 and 914. The sonar image 910 does not include the sea floor 908 as shown in FIG. 9A, to improve the visibility of the targets 912 and 914, thus making the location tracking and analysis of the targets 912 and 914 easy. FIG. 10 illustrates a sonar image on 2D chart display, in accordance with an example embodiment. FIG. 10 illustrates the sonar image 1002 displaying the targets 1004 and bathymetry 1006, i.e., the seafloor topography. In an embodiment, the bathymetry 1006 is shown with a different color such that the targets 1004 may be visible to the user easily.

In one embodiment, the processing circuitry 118 may acquire a second list of detected targets obtained from a second ultrasonic reflection wave corresponding to a second ultrasonic transmission wave transmitted earlier than the ultrasonic transmission wave, and generate the sonar image further based on the second list of detected targets by placing a second predetermined graphical image for each target in the second list. In other words, the second list of detected targets is historical data associated with the same area on the same display as the current data and may be optionally displayed on the display 128. The historical data may be displayed using the same or a different color, the same or a different intensity, or the same or a different transparency to visualize movement of targets better.

The sonar image that is displayed on the display 128 may be at least one of: an instantaneous sonar image (i.e., the sonar data of the last transmission wave), an aggregated sonar image (i.e., the sonar data is aggregated from many transmission waves, where higher intensity represents more hits of the detected target), a historical sonar image (i.e., the aggregated sonar image in which data from old transmission waves is faded or displayed with a different color to allow path of targets to be interpreted), and a selective sonar image (i.e., any of the above sonar images with specific range, depth, or target type limitations).

FIG. 11 is a flow chart illustrating a sonar method for facilitating a sonar image representing an underwater environment, in accordance with an example embodiment. At S11, the transducer 114 transmits an ultrasonic transmission wave into the underwater environment. At S12, the transducer 114 receives an ultrasonic reflection wave corresponding to a reflection of the ultrasonic transmission wave on an underwater object in the underwater environment.

At S13, the transducer 114 generates a return signal based on the ultrasonic reflection wave. At S14, the beamforming module 120 generates a plurality of reception beams making different angles with the horizontal direction by performing a beamforming process based on the generated return signal. At S15, the beamforming module 120 generates reception beam data for each reception beam of the plurality of reception beams.

At S16, the target detection module 122 detects a plurality of targets within the reception beam data. At S17, the target detection module 122 creates a list of the detected plurality of targets. Each target of the plurality of targets is defined at least by a range associated with the transducer and an angle of corresponding reception beam on which the target is detected.

At S18, the image generation module 124 at least one of: rotates the predetermined graphical image and utilizes a pre-rotated image of the predetermined graphical image based on the angle of the target when placing the predetermined graphical image on the sonar image. At S19, the image generation module 124 generates the sonar image based on the list of the detected plurality of targets by placing a predetermined graphical image for each target of the plurality of targets in the list at a position calculated based on the range and the angle of the target.

The sonar system disclosed presents a multifaceted advantage in the domain of sonar technology by enabling the generation of a clean and easily interpretable 'raw' sonar display picture from data that may undergo significant filtering processes. The system includes a target reduction process that not only facilitates the storage and tracking of data in a compact format but also allows for the creation of a representative sonar display from the processed data, significantly enhancing user interpretation. The system provides the ability to modify the regenerated data to suit specific user preferences. For instance, in situations where the beam width at increasing range may lead to confusion, the system offers control over the width of the displayed beam. This flexibility empowers users to create a more intuitive representation, such as a flatter-looking seafloor, thereby improving the interpretability of the data. The resultant sonar image not only benefits from cleaner and clearer representations of targets but also allows for fine-tuning the appearance of these targets. Despite the potentially extensive filtering applied to the data, targets can be tailored to maintain a visually pleasing and natural appearance, enhancing the overall user experience. The system provides efficiency to both data processing and transmission. The raw target information is notably smaller in size compared to a full-resolution sonar display, which includes spatial information, noise, oversampling, and other details. The reduction in data volume is advantageous in several ways, including reducing memory and processing load, particularly when intensive filters are applied. Additionally, it results in less data for ping-to-ping tracking and filtering processes, optimizing network bandwidth utilization, especially in scenarios where data needs to be recorded or transmitted efficiently.

Although the embodiments of the present disclosure have been described above, the present disclosure is not limited to the embodiments described above, and various modifications can be made by those skilled in the art.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A sonar device configured to be installed on a vessel, the sonar device comprising:

a display;

a transducer comprising a plurality of transducer elements, wherein the transducer is configured to;

transmit an ultrasonic transmission wave into the underwater environment, and receive an ultrasonic reflection wave corresponding to a reflection of the ultrasonic transmission wave on an underwater object in the underwater environment, wherein each transducer element of the plurality of transducer elements is configured to generate a return signal based on the ultrasonic reflection wave; and processing circuitry configured to:

generate a plurality of reception beams making different angles with the horizontal direction by performing a beamforming process based on the return signal generated by each transducer element of the plurality of transducer elements;

generate reception beam data for each reception beam of the plurality of reception beams;

detect a plurality of targets within the reception beam data;

create a list of the detected plurality of targets, each target of the plurality of targets defined at least by a target-specific range associated with the transducer and an angle, relative to a predetermined sonar pointing direction, of a corresponding reception beam on which the target is detected; and based on the list of the detected plurality of targets, display a sonar image on the display, the sonar image including a predetermined graphical image for each target of the plurality of targets in the list, each target of the plurality of targets being displayed at a target-specific position calculated based on the target-specific range and the angle of the corresponding reception beam on which the target is detected, wherein the predetermined graphical image for each target of the plurality of targets in the list consists of a stretched-out circle having an orientation corresponding to the angle, relative to the predetermined sonar pointing direction, of the corresponding reception beam on which the target is detected.

2. The sonar device of claim 1, wherein the predetermined graphical image comprises at least a core portion and a ring portion surrounding the core portion, the core portion having a core color and the ring portion having a ring color different from the core color.

3. The sonar device of claim 2, wherein the predetermined graphical image further comprises a set of outer ring portions surrounding the ring portion, a color of the set of outer ring portions being different from the core color and the ring color.

4. The sonar device of claim 2, wherein each target in the list is further defined by an intensity of the reception beam data of the detected target, and wherein the intensity of the target determines the core color of the predetermined graphical image of the target.

5. The sonar device of claim 4, wherein the intensity of the target determines the ring color based on the core color and a color table.

6. The sonar device of claim 1, wherein each predetermined graphical image is displayed with a rotation relative to the predetermined sonar pointing direction, the rotation corresponding to the angle of the corresponding reception beam on which the target is detected.

7. The sonar device of claim 6, wherein the processing circuitry is further configured to generate the predetermined graphical image for each target of the plurality of targets in the list by one of:

rotating a single pre-stored image according to the angle of the corresponding reception beam on which the target is detected, or retrieving an image from a library of pre-rotated images based on the angle of the corresponding reception beam on which the target is detected.

8. The sonar device of claim 1, wherein a size of the predetermined graphical image of each target of the plurality of targets is determined based on the range of the target.

9. The sonar device of claim 1, wherein:

the processing circuitry is further configured to:

associate each target in the list with a target-specific detection quality index that defines a degree of certainty of the target detection, and adjust at least one of a color or a transparency of the predetermined graphical image of each target according to the target-specific detection quality index.

10. The sonar device of claim 1, wherein:

each target in the list is further defined by an intensity of the reception beam data of the detected target, a color of the predetermined graphical image of each target is determined based on the intensity of the target, and to generate the predetermined graphical image of an individual target, the processing circuitry is further configured to:

render the intensity of the reception beam data by placing in the sonar image the predetermined graphical image of each target in the list at the position where the respective target is detected, wherein the sonar image excludes any other rendering of the intensity of reception beam data.

11. The sonar device of claim 1, wherein the predetermined graphical image is a sprite.

12. The sonar device of claim 1, wherein the processing circuitry is further configured to:

acquire a second list of detected targets obtained from a second ultrasonic reflection wave corresponding to a second ultrasonic transmission wave transmitted earlier than the ultrasonic transmission wave; and generate the sonar image further based on the second list of detected targets by placing a second predetermined graphical image for each target in the second list.

13. A sonar method for facilitating a sonar image representing an underwater environment, the sonar method performed by a sonar device installed on a vessel and comprising:

transmitting an ultrasonic transmission wave into the underwater environment with a transducer;

receiving an ultrasonic reflection wave corresponding to a reflection of the ultrasonic transmission wave on an underwater object in the underwater environment;

generating a return signal based on the ultrasonic reflection wave;

generating a plurality of reception beams making different angles with the horizontal direction by performing a beamforming process based on the generated return signal;

generating reception beam data for each reception beam of the plurality of reception beams;

detecting a plurality of targets within the reception beam data;

creating a list of the detected plurality of targets, each target of the plurality of targets defined at least by a target-specific range associated with the transducer and an angle, relative to a predetermined sonar pointing direction, of a corresponding reception beam on which the target is detected; and based on the list of the detected plurality of targets, displaying a sonar image on a display, the sonar image including a predetermined graphical image for each target of the plurality of targets in the list, each target of the plurality of targets being displayed at a target-specific position calculated based on the target-specific range and the angle of the corresponding reception beam on which the target is detected, wherein the predetermined graphical image for each target of the plurality of targets in the list consists of a stretched-out circle having an orientation corresponding to the angle, relative to the predetermined sonar pointing direction, of the corresponding reception beam on which the target is detected.

14. The sonar method of claim 13, wherein the predetermined graphical image comprises at least a core portion and a ring portion surrounding the core portion, the core portion having a core color and the ring portion having a ring color different from the core color.

15. The sonar method of claim 14, wherein the predetermined graphical image further comprises a set of outer ring portions surrounding the ring portion, a color of the set of outer ring portions being different from the core color and the ring color.

16. The sonar method of claim 14, wherein each target in the list is further defined by an intensity of the reception beam data of the detected target, and wherein the intensity of the target determines the core color of the predetermined graphical image of the target, and wherein the intensity of the target determines the ring color based on the core color and a color table.

17. The sonar method of claim 13, wherein the predetermined graphical image is a sprite.

18. The sonar method of claim 13, wherein the displaying the sonar image comprises displaying each predetermined graphical image with a rotation relative to the predetermined sonar pointing direction, the rotation corresponding to the angle of the corresponding reception beam on which the target is detected; and wherein the method further comprises generating the predetermined graphical image for each target of the plurality of targets in the list by one of:

rotating a single pre-stored image according to the angle of the corresponding reception beam on which the target is detected, or retrieving an image from a library of pre-rotated images based on the angle of the corresponding reception beam on which the target is detected.

19. The sonar method of claim 13, wherein a size of the predetermined graphical image of each target of the plurality of targets is determined based on the range of the target.

20. A non-transitory computer-readable storage medium having stored thereon machine-readable instructions which, when executed by one or more processors of an apparatus installed on a vessel, cause the apparatus to perform a method comprising:

transmitting an ultrasonic transmission wave into the underwater environment with a transducer;

receiving an ultrasonic reflection wave corresponding to a reflection of the ultrasonic transmission wave on an underwater object in the underwater environment;

generating a return signal based on the ultrasonic reflection wave;

generating a plurality of reception beams making different angles with the horizontal direction by performing a beamforming process based on the generated return signal;

generating reception beam data for each reception beam of the plurality of reception beams;

detecting a plurality of targets within the reception beam data;

creating a list of the detected plurality of targets, each target of the plurality of targets defined at least by a target-specific range associated with the transducer and an angle, relative to a predetermined sonar pointing direction, of a corresponding reception beam on which the target is detected; and based on the list of the detected plurality of targets, displaying a sonar image on a display, the sonar image including a predetermined graphical image for each target of the plurality of targets in the list, each target of the plurality of targets being displayed at a target-specific position calculated based on the target-specific range and the angle of the corresponding reception beam on which the target is detected, wherein the predetermined graphical image for each target of the plurality of targets in the list consists of a stretched-out circle having an orientation corresponding to the angle, relative to the predetermined sonar pointing direction, of the corresponding reception beam on which the target is detected.

* * * * *